(12) United States Patent
Krco et al.

(10) Patent No.: US 9,191,774 B2
(45) Date of Patent: Nov. 17, 2015

(54) METHOD FOR DISTRIBUTION OF INFORMATION OF NETWORKS OR ENTITIES USING UE AS GATEWAY

(75) Inventors: Srdjan Krco, Dublin (IE); Mattias Johansson, Solna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 211 days.

(21) Appl. No.: 12/995,573

(22) PCT Filed: Jun. 4, 2008

(86) PCT No.: PCT/EP2008/056895
§ 371 (c)(1),
(2), (4) Date: Dec. 1, 2010

(87) PCT Pub. No.: WO2009/146740
PCT Pub. Date: Dec. 10, 2009

(65) Prior Publication Data
US 2011/0092186 A1    Apr. 21, 2011

(51) Int. Cl.
*H04B 1/38* (2015.01)
*H04W 4/02* (2009.01)
*H04W 4/20* (2009.01)
*H04L 29/08* (2006.01)
*H04W 88/04* (2009.01)

(52) U.S. Cl.
CPC ............... *H04W 4/02* (2013.01); *H04L 67/18* (2013.01); *H04W 4/20* (2013.01); *H04W 88/04* (2013.01)

(58) Field of Classification Search
CPC ....... H04W 48/04; H04W 4/027; H04W 4/04; H04W 4/12; H04W 4/14; H04W 36/32
USPC .......... 455/410–411, 428–453, 456.1–456.3; 370/328–333
See application file for complete search history.

(56) References Cited

U.S. PATENT DOCUMENTS

| 6,810,250 B2 * | 10/2004 | Jo et al. .......................... 455/433 |
| 8,135,362 B2 * | 3/2012 | LaDue ........................... 455/126 |
| 2002/0080757 A1 * | 6/2002 | Narvanen et al. .............. 370/338 |
| 2002/0086670 A1 * | 7/2002 | Rajaniemi et al. ............ 455/426 |
| 2004/0266390 A1 * | 12/2004 | Faucher et al. ............ 455/404.1 |
| 2005/0151686 A1 * | 7/2005 | Ali et al. ........................ 342/464 |
| 2006/0264217 A1 * | 11/2006 | Shaheen ........................ 455/445 |

(Continued)

FOREIGN PATENT DOCUMENTS

| WO | 2006/124840 A1 | 11/2006 |
| WO | 2006/137646 A1 | 12/2006 |

*Primary Examiner* — Dai A Phuong
(74) *Attorney, Agent, or Firm* — Patent Portfolio Builders, PLLC

(57) ABSTRACT

The present invention relates to a method for distribution of information in a primary cellular network. At least one second network or at least one second entity is using a User Equipment (UE) for forwarding information between the second network or entity and a service provider, wherein the second network or entity provides the UE with information about its properties. The method comprises the steps of: (1) the UE sending a first message to a third entity in a third network to inform about the location and properties of the UE, (2) the first message being such that it triggers the third entity to send system information to the UE. What particularly characterizes the method is that the UE sends 30 secondary data in the first message to the third entity, said secondary data comprising information about the properties of the second network or entity.

20 Claims, 2 Drawing Sheets

(56) References Cited

U.S. PATENT DOCUMENTS

| | | | |
|---|---|---|---|
| 2006/0286979 A1* | 12/2006 | Enderlein et al. | 455/435.1 |
| 2007/0124438 A1 | 5/2007 | Park et al. | |
| 2008/0305807 A1* | 12/2008 | Shoki et al. | 455/456.1 |
| 2012/0264443 A1* | 10/2012 | Ng et al. | 455/450 |
| 2014/0370863 A1* | 12/2014 | Proctor et al. | 455/414.3 |
| 2015/0031402 A1* | 1/2015 | Sridhara et al. | 455/456.6 |

* cited by examiner

METHOD FOR DISTRIBUTION OF INFORMATION OF NETWORKS OR ENTITIES USING UE AS GATEWAY

TECHNICAL FIELD

The present invention relates to a method, a UE, a third entity, a fourth entity, a service provider and a primary cellular network for distributing information in the primary cellular network.

BACKGROUND

In 3G (third generation mobile phone standard) and L0TE (Long Term Evolution) networks today, each UE (User Equipment) when activated goes through a set of registration and attach procedures with the core network before the end user can make a call or use some other network services. During these activities the UE informs the network of their IMSI number and other specific UE capabilities for this particular UE and get appropriate network identifications that are used for subsequent call establishments.

UEs in today's networks are considered as devices that end users use to access services that the network provides. Such services are voice calls, SMS and MMS and in the high speed 3G networks also services that relates to data access, for instance to email and internet.

The role of the UE is changing, and there is now a possibility to connect new functionality, for instance in form of a separate unit, to the phone. Examples of such separate units are cameras and sensors that can be used in health care. The UE can be used as a personal health check device that can be connected over mobile networks to health professionals to forward them relevant patient's health data. Since the UE also already contains a remote camera, the accessibility by anyone in need of a photo or a video recording of a certain area is another obvious functionality. Other applications are in the areas of sharing music or offering information about the prices and special offers in a shopping mall gathered via a built-in RFID reader.

Another example of such mobile phone functionality is in the area of wireless sensor networks (WSN). When connecting a sensor to the UE, the phone can serve as a sensor network gateway. A WSN comprises distributed autonomous devices that use sensors to monitor conditions, such as temperature, pressure, sound, moving objects and pollutant. WSN are used in many areas such as including environment and habitat monitoring, health monitoring, burglar alarms, automatic meter reading, home automation and other types of Machine to Machine (M2M) type of services.

The various types of sensors will use short range wireless communication (such as Bluetooth) to communicate via a UE to the rest of the world. For example, Bluetooth SIG is standardizing the communication protocol for interaction of health and fitness sensors with an UE, with the intention to allow prolonged health monitoring of mobile subscribers.

As we go towards the future internet, more and more such devices will be introduced (Internet of Things). The only way to inform the backend service providers about the existence, location and availability of such sensors is by using a purposely built user application on an UE. The above problem is not only apparent in mobile phones, but also other devices whole sole intention is to provide sensor communication, such as M2M devices for AMR (Automatic Meter Reading) or security applications that have to depend on purposely built availability schemes built on for instance SMS etc.

SUMMARY

The object of the present invention is therefore to provide a way of improving the communication between the UE and the service provider when connecting a new functionality to the UE, so that the service provider can make use of the services of the functionality.

The object of the present invention is solved by means of a User Equipment (UE) for distribution of information in a primary cellular network. At least one second network or at least one second entity is using the UE for forwarding information between the second network or entity and a service provider, where the second network or entity provides the UE with information about its properties. The UE is adapted to send a first message to a third entity in a third network to inform about the location and properties of the UE (10). The UE is further adapted to receive system information from the third entity. What particularly characterizes the UE is that it is adapted to send secondary data in the first message to the third entity. Said secondary data comprises information about the properties of the second network or entity.

The object of the present invention is also solved by means of a third entity in a third network for distribution of information in a primary cellular network. At least one second network or at least one second entity is using a User Equipment (UE) for forwarding information between the second network or entity and a service provider, where the second network or entity provides the UE (10) with information about its properties. The third entity is adapted to receive a first message from the UE informing about the location and properties of the UE (10). The third entity is further adapted to be triggered by the first message to send system information to the UE. What particularly characterizes the third entity is that it is adapted to receive the secondary data in the first message from the UE according to any of the claims 1-6, at least informing the network about the properties of the second network or entity. Furthermore, the third entity is adapted to receive a second request message from a fourth entity in the third network or the third entity and the fourth entity has a publish and subscribe relationship.

The object of the present invention is also solved by means of a fourth entity for distribution of information in a primary cellular network. At least one second network or at least one second entity is using the User Equipment (UE) for forwarding information between the second network or entity and a service provider, wherein the second network or entity provides the UE with information about its properties. What particularly characterizes the fourth entity is that it is adapted to receive the secondary data from the third entity according to any of the claims 7-10. It is further adapted to authenticate and authorize access to the secondary data.

The object of the present invention is moreover solved by means of a primary cellular network comprising the UE according to any of the claims 1-6, the third entity according to any of the claims 7-10 and the fourth entity according to any of the claims 11-16.

The object of the present invention is finally solved by means of a method for distribution of information in a primary cellular network. At least one second network or at least one second entity is using a User Equipment (UE) for forwarding information between the second network or entity and a service provider, wherein the second network or entity provides the UE with information about its properties. The method comprises the steps of: (1) the UE sending a first message to a third entity in a third network to inform about the location and properties of the UE, (2) the first message being such that it triggers the third entity to send system information to the UE.

What particularly characterizes the method is that the UE sends secondary data in the first message to the third entity, said secondary data comprising information about the properties of the second network or entity.

By embedding Wireless Sensor Network (WSN) properties (such as the availability) in the already existing signalling in a cellular network, efficiency will be enhanced both in terms of network usage and development complexity for the individual service developer.

Moreover, providing a standardized interface for external entities to reach signalling information, enhance the possibility to build $3^{rd}$ party services.

Further advantages will appear for the embodiment in the detailed description.

BRIEF DESCRIPTION OF DRAWINGS

In the following text the invention will be described in detail with reference to the attached drawings. These drawings are used for illustration only and do not in any way limit the scope of the invention.

DETAILED DESCRIPTION

Figure 1:
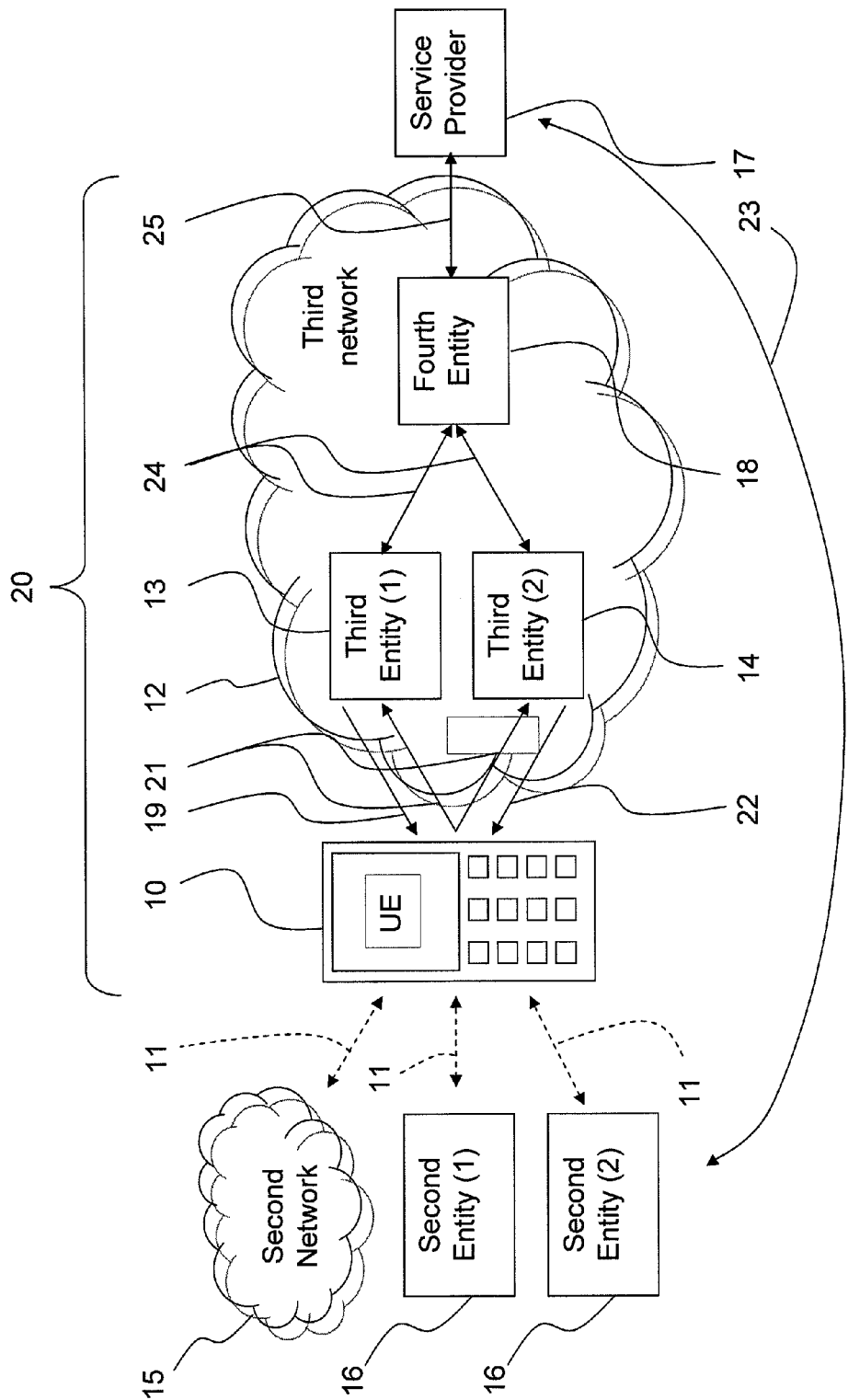
FIG. 1 schematically shows the structure of primary cellular network into which the invention is implemented.

The invention will now be described in detail with reference to embodiments described in the detailed description and shown in the drawings. The embodiments of the invention with further developments described in the following are to be regarded only as examples and are in no way to limit the scope of the protection provided by the patent claims.

The present invention relates to a method, a UE, a third entity, a fourth entity, a service provider and a primary cellular network for distributing information in the primary cellular network. The detailed description describes different method embodiments according to the present invention. The UE, the entities, the service provider and the network are adapted for performing the method steps according to the detailed description. It should therefore be understood by a person skilled in the art that since the method steps are described, the UE, the entities, the service provider and the network are also disclosed in the detailed description.

In FIG. 1 a User Entity (UE) 10, in form of a mobile station (mobile phone) is shown. The UE communicates wirelessly with a third network 12, comprising two third entities 13,14. A second network 15 or at least one second entity 16 is using the UE for forwarding information between the second network or entity and a service provider 17. The second network or entity provides the UE with information about its properties through a wireless or wired connection 11.

The UE 10 could be a mobile phone or any other device whose intention is to forward information between the second network 15 or entity 16 and the service provider 17. Such a device is for instance an M2M device for AMR or a security application such as a burglar alarm. The main purpose of the UE is to provide information or data collected by the second network 15 or entity 16 to the service provider 17, but in order for the service provider 17 to be aware of the status of the second network 15 or entity 16 purposely built availability schemes built on for instance SMS etc. have been designed.

The second network 15 could be a Wireless Sensor Network for instance monitoring temperature, pressure, sound, moving objects and pollutant. The second entity 16 could be a camera, a disc drive or any other means capable of providing the information. The third network 12 could be a core network of some kind, such as a Wireless Code Division Multiple Access (WCDMA) network.

The service provider 17 is an entity offering services like environment and habitat monitoring, health monitoring, burglar alarms, automatic meter reading, home automation and other types of Machine to Machine (M2M) type of services. The UE 10 and the third network 12 are part of the primary cellular network 20.

The method for distributing information in the primary cellular network 20 comprises a first step in which the UE 10 sends a first message 21 to the third entity 13,14 in the third network 12, to inform about the location and properties of the UE 10. The first message is such that it triggers the third entity to send system information 22 to the UE 10. The first message is part of an update.

The first message 21 is for instance a Location Update Request or a Routing Area Update request message (will be described later). As a part of the registration procedure of the UE in the third network 12, the location update procedure (circuit switched domain) or the routing area update procedure (packet switched domain) is triggered and the UE is registered in the third network 12. When the third network receives a Location Area Update Request message, it replies with a Location Area Update Accept message in normal cases. When the third network receives a Routing Area Update Request message, it responds with the Routing Area Update Accept. After performing the Location Update procedure or the Routing Area Update request, the system information 22 received by the third entity is stored in the UE 10. The update procedure is used to inform the third network 12 about the properties of the UE.

Figure 2:
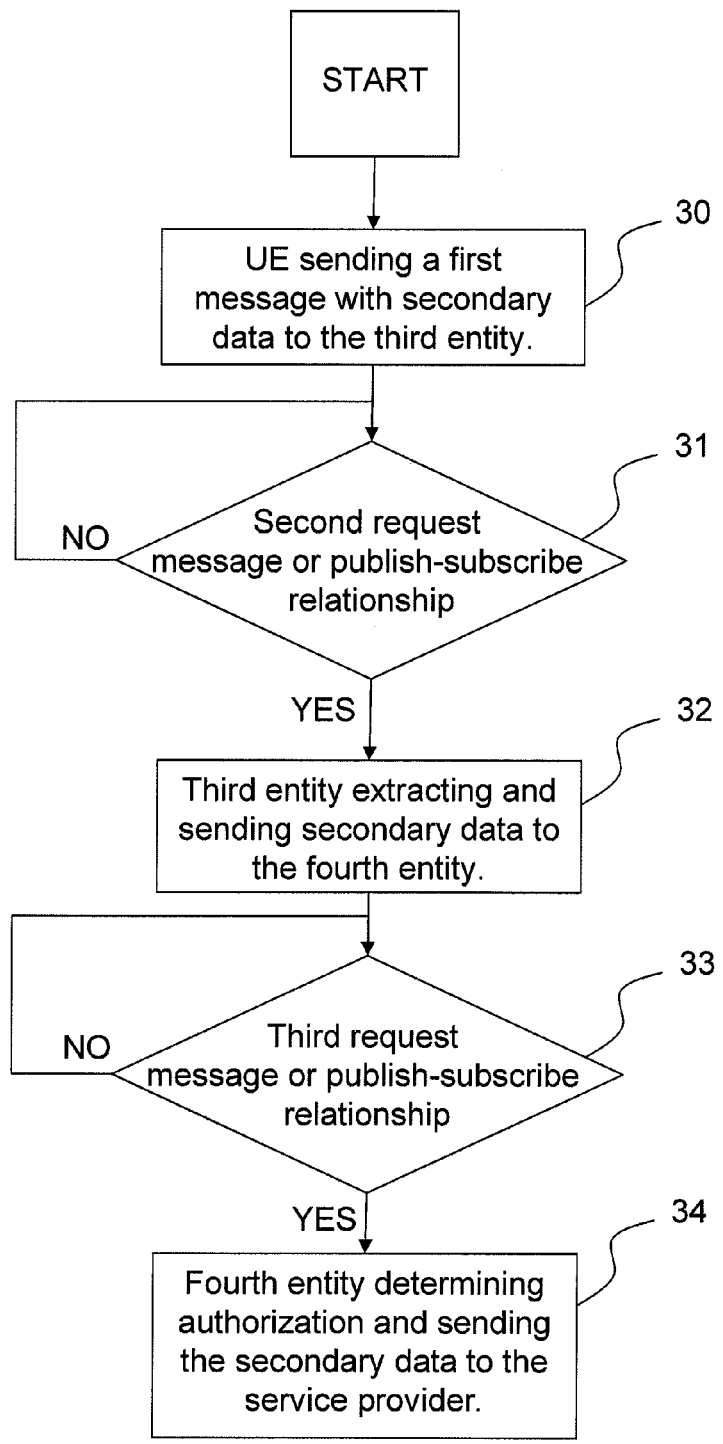
FIG. 2 shows a flow diagram of the method for distributing information in the primary cellular network according to FIG. 1.

In order to enable the provisions for distributing information about the second network 15 or the second entity 16 in the primary cellular network, the method according to the present invention comprises a further step, see FIG. 2. In this step the UE 10 sends 30 secondary data in the first message to the third entity 13,14. The secondary data comprises information about the properties of the second network or entity.

The properties of the UE and the second network or second entity preferably relates to availability information. In the following, availability will therefore be used as an example of properties. Availability information indicates if the UE/entity/network is present.

If the method is used in a circuit switched third network 12, the third entity 13 consists in a Mobile Switching Center (MSC). The first message then consists in a Location Area Update Request message. If the method is used in a packet switched third network 12, the third entity 14 consists in a Serving Generic Packet Radio Services (GPRS) Support Node and the first message consists in a Routing Area Update Request message. The first message in principle can be any message that contains the availability information of the UE 10. In case of 3G (may also be the case for LTE) it is the Location/Routing area update request message.

The existing Location Area Update Request message or Routing Area Update Request message comprises a number of Information Elements (IE). An IE is a data packet of a particular length which has been encoded by a communication protocol for transmission over a node-to-node link. The Location Area Update Request message has the following IE as content:

Mobility management protocol discriminator (Protocol discriminator)
Skip Indicator
Location Area Update Request message type (Message type)
Ciphering key sequence Number
Location area identification
Mobile station classmark
Mobile identity
Mobile station classmark for UMTS The IE content of the Routing Area Update Request message is:

Protocol discriminator
Skip Indicator
Routing Area update request message identity (Message type)
Update type
GPRS ciphering key sequence number (Ciphering key sequence number)
Old routing area identification (Routing Area identification)
MS Radio Access Capability
Old P-TMSI signature (P-TMSI signature)
Requested READY timer value (GPRS timer)
DRX parameter
TMSI status
P-TMSI (Mobile Indentity)
MS network capability
PDP context status
PS LCS Capability
MBMS context status The existing solutions enables a network to monitor the location and availability of UEs attached to the network.

The secondary data is in the present invention embedded into the existing first messages. This is made in order to support transfer of the availability information of devices attached to an UE (or a standalone M2M device). The UE 10 is used to communicate with the service provider 17. The secondary data preferably consists in an information element in the first message, which may be called ExtDeviceInfo. This element describes the availability of the second network 15 or device 16. The information element comprises information about:

the number of second networks or second entities included in the information element,
identity of the second network or entity together with the local validity,
the type of second network or entity,
location of the second network or entity relative to the UE position.

The element ExtDeviceInfo could have the following characteristics (the name, in bold, of the field can be varied freely):

ExtDeviceInfo—IE ExtDeviceNum (4 bits)—Number of secondary networks or entities in the new information element.
ID (4 bits)—Identity of an external device, local validity.
Type (2 bytes)—Identifies the type of second network or device/devices (for example a WSN).
Location (4 bytes)—Location of the external device relative to the UE position.

In the present invention, a fourth entity 18 is added in the third network 12. This is part of the primary cellular network 20. This entity should be capable of authenticating and authorizing access to the secondary data. This could possibly be performed with the help from a Home Location Register (HLR) or a Home Subscriber Server (HSS). This will be described later.

The method according to the present invention comprises a step 31, see FIG. 2, where the fourth entity 18 sends a second request message to the third entity 13,14. As an alternative the third entity and the fourth entity has a publish and subscribe relationship. These are two possible relationships between the two entities. The decision is shown as 31 in FIG. 2. Request messages are used for once-off requests when the service provider 17 wants to find out the secondary data regarding a particular second network 15 or entity 16. The second request message is then sent from the service provider 17 to the fourth entity, which sends it to the third entity.

Publish and subscribe relationships are used when the fourth entity is interested in continuously getting information about the secondary data. The meaning of continuously is that the data is sent periodically or when the status of the secondary data changes ("event-triggered").

When there is a publish and subscribe relationship, the UE 10 sends the first message periodically or when the status of the secondary data changes. Commonly, location or routing area update procedures allow an UE to inform the third network 12 about certain events. An example of an event, when the UE need to inform the third network, is for instance when a mobile is switched on or off or when the UE moves from one location area to the next while not on a call. In the present invention, a further event is added, which is when the status of the secondary data changes. Then the first message is also sent to the third entity 13,14. The UE 10 could also be triggered to send the first (update) message on other criteria e.g. at identification of new added device to the second network 15 or when a new second entity 16 added.

When the UE 10 reports periodically, a periodic update procedure is used. The periodic update procedure is then run periodically to inform the network about the availability of the UE. The period is determined by a timer. There are different timers for the Location Area Update procedure and the Routing Area Update procedure. For the Routing Area update timer, the value of the timer is sent by the network 12 to the UE as system information in the messages Attach Accept and the Routing Area Update Request. The value of this timer is unique within the Routing Area.

When the third entity 13,14 receives the second request message or when there is a publish and subscribe relationship 31 (periodically or "event-triggered") 31, the third entity performs the steps 32 of:

extracting the secondary data from the first message, and
sending the secondary data to the fourth entity 18.

This is illustrated in FIG. 2. The third entity consequently forwards the secondary data to the fourth entity. In FIG. 1 the communication link 24 enabling the transmission of the second request message and the secondary data is shown. When the fourth entity 18 receives the secondary data it performs the step of storing the data.

The role of the fourth entity is to enable the service provider as an external entity to reach the secondary data provider by the second network 15 or entity 16 to the third network. In order to control the distribution of the secondary data, the invention comprises a step of the fourth entity 17 authenticating and authorizing access to the secondary data. The fourth entity consists in an availability server which controls the access to the data. The fourth entity 18 also provides a single point of attachment for the service provider 17, and enables the service provider to not have to scan different third entities 13,14 for the correct information.

The third entity may change and the fourth entity hence may have to send the second request message to a multiple of these entities and only get response from one of them.

The authentication and authorizing function needs to be present in the third network 12. The function can be located in the fourth entity 18 or somewhere else, such as in the HLR or HSS. In such a case, there must be a messaging between the fourth entity and the HLR/HSS. A diameter protocol may be used between the fourth entity and the HLR/HSS. As an alternative, the authorization data is forwarded to the fourth entity form the HLR/HSS during the UE attachment phase or when the secondary data is first requested (second or third request message). Then the authorization and authentication is done at the fourth entity.

The authentication and authorization function performs the following action:

1. Maintaining an access control list specifying which service providers that have access to what kind of secondary data. For instance, if the UE 10 has a set of sensors attached to it, it may be that a medical application should be authorized to monitor the secondary data relating to those sensors, but no other. Similar at home, it may be that the burglar alarm should be able to monitor the availability status of the alarm sensors, but not the sensor relating to for instance energy consumption.

2. Maintaining authentication data required to authenticate the service provider to provide authorization. This includes maintaining an identity, corresponding secret and preferred authentication method.

3. Performing accounting so that an UE (or subscriber) can check who has received information about secondary devices attached to the UE and also for payment purposes. The service provider may have to compensate either the third network or the subscriber for the access to the availability service.

The authentication is preferably done once for each session and associated pair 23 of service provider 17 and corresponding second network 15 or entity 16. However, there might be that the UE (subscriber) where the second network 15 or entity 16 are attached changes the policies and decides not to allow sharing the secondary data with a particular service provider 17 depending on its current context. In that case, the authentication would have to be done again. Also, the term session above means between a defined start and end, and an example of a session may be a request/response pair or subscription and the following replies. Alternatively, authentication can be performed at each interaction between the service provider 17 and the fourth entity 18.

The present invention comprises a step of the service provider 17 sending a third request message to the fourth entity 18. As an alternative the fourth entity 18 and the service provider 17 has a publish and subscribe relationship. These are two possible relationships between the two entities. The decision is shown as 33 in FIG. 2.

If the service provider 17 is authorized to receive the secondary data, further steps can be performed. When the fourth entity 18 receives the third request message or when there is a publish and subscribe relationship 33, the fourth entity performs the steps of 34:

determining if the service provider has an authorization to receive the secondary data, and sending the secondary data to the service provider 17 if the service provider has the authorization.

This is illustrated in FIG. 2. The fourth entity 18 consequently forwards the secondary data to the service provider 17 when this is allowed to receive the data. In FIG. 1 the communication link 25 enabling the transmission of the third request message and the secondary data is shown.

When the service provider 17 subscribes to the secondary data, the fourth entity will inform the service provider periodically or when changes occur. Both when there is a subscription or when the service provider request for the secondary data, the service provider will control the authorization before sending the data.

One option is that the fourth entity 18 sends the second request message (step 31) when the service provider 17 sends the third request message. In such a case, the fourth entity acts as a proxy between the service provider and the third entity 13,14. Also in this case, the fourth entity will determine if the service provider has an authorization to receive the secondary data.

A person skilled in the art would realize that any technique for wireless communication and any type of access network can be used together with the present invention. Moreover, the skilled person would realize that any type of UE 10 whose role is to forward information between the second network 15 or entity 16 and the service provider 17 can be used. The skilled person would also realize that any type of the second network or entity could be used as long as it is capable of providing said information. The skilled person would furthermore realize that the third network 12 could be any kind of network comprising the third 13,14 and fourth 18 entity.

The flow diagram in FIG. 2 is not exactly a time sequence, which means that steps may performed in another order or at the same time. Still, all of the steps illustrated in the figure are performed in the present invention.

The invention claimed is:

1. A User Equipment (UE) for distribution of information in a cellular network, the UE comprising one or more processing circuits configured to:

receive, via short range wireless communication with one or more machine-to-machine (M2M) type networks or entities, M2M data collected by those one or more M2M type networks or entities;

forward the M2M data, via the cellular network, to an M2M type service provider that provides M2M type services using that M2M data, wherein the M2M type service provider and the one or more M2M type networks or entities are external to the cellular network;

obtain M2M properties from the one or more M2M type networks or entities indicating an existence, location, and/or availability of the one or more M2M type networks or entities, wherein said M2M properties are different than said M2M data;

send the M2M properties to a core network of the cellular network that is configured to forward those M2M properties to the M2M type service provider, by embedding the M2M properties within a message that indicates a location and/or availability of the UE and sending that message to the core network as part of a process to update the core network about the location and/or availability of the UE, wherein the location and/or availability of the UE is distinct from the location and/or availability of the one or more M2M type networks or entities, and wherein the core network is configured to extract the M2M properties from the message for forwarding to the M2M type service provider, but to use the location and/or availability of the UE itself rather than forwarding to the M2M type service provider; and responsive to sending the message, receive system information from the core network.

2. The UE of claim 1, wherein the message is a Location Area Update Request message or a Routing Area Update Request message.

3. The UE of claim 1, wherein said M2M type services comprise at least one of environment monitoring, habitat monitoring, health monitoring, burglar alarm monitoring, automatic meter reading, and home automation.

4. The UE of claim 1, wherein the one or more processing circuits are configured to send the message periodically irrespective of whether the M2M properties have been embedded within the message.

5. The UE of claim 1, wherein the one or more processing circuits are configured to send the message responsive to the M2M properties changing.

6. The UE of claim 1, wherein the M2M properties indicate a number of said one or more M2M type networks or entities.

7. The UE of claim 1, wherein the M2M properties indicate an identity of each of said one or more M2M type networks or entities, together with local validity.

8. The UE of claim 1, wherein the M2M properties indicate a type of each of said one or more M2M type networks or entities.

9. The UE of claim 1, wherein the M2M properties indicate a location of each of said one or more M2M type networks or entities, relative to the location of the UE.

10. The UE of claim 1, wherein the one or more processing circuits are configured to send the message during an idle state of the UE.

11. The UE of claim 1, wherein:
the message is a Location Area Update Request message or a Routing Area Update Request message;
wherein said M2M type services comprise at least one of environment monitoring, habitat monitoring, health monitoring, burglar alarm monitoring, automatic meter reading, and home automation; and
the M2M properties indicate a number of said one or more M2M type networks or entities, an identity or type of each of said one or more M2M type networks or entities, and/or a location of each of said one or more M2M type networks or entities, as distinct from a location of the UE.

12. A method implemented by a User Equipment (UE) for distribution of information in a cellular network, wherein the method comprises:
receiving, via short range wireless communication with one or more machine-to-machine (M2M) type networks or entities, M2M data collected by those one or more M2M type networks or entities;
forwarding the M2M data, via the cellular network, to an M2M type service provider that provides M2M type services using that M2M data, wherein the M2M type service provider and the one or more M2M type networks or entities are external to the cellular network;
obtaining M2M properties from the one or more M2M type networks or entities indicating an existence, location, and/or availability of the one or more M2M type networks or entities, wherein said M2M properties are different than said M2M data;
sending the M2M properties to a core network of the cellular network that is configured to forward those M2M properties to the M2M type service provider, by embedding the M2M properties within a message that indicates a location and/or availability of the UE and sending that message to the core network as part of a process to update the core network about the location and/or availability of the UE, wherein the location and/or availability of the UE is distinct from the location and/or availability of the one or more M2M type networks or entities, and wherein the core network is configured to extract the M2M properties from the message for forwarding to the M2M type service provider, but to use the location and/or availability of the UE itself rather than forwarding to the M2M type service provider; and
responsive to sending the message, receiving system information from the core network.

13. The method of claim 12, wherein the message is a Location Area Update Request message or a Routing Area Update Request message.

14. The method of claim 12, wherein said M2M type services comprise at least one of environment monitoring, habitat monitoring, health monitoring, burglar alarm monitoring, automatic meter reading, and home automation.

15. The method of claim 12, wherein said sending comprises sending the message during an idle state of the UE.

16. The method of claim 12, wherein the M2M properties indicate a number of said one or more M2M type networks or entities.

17. The method of claim 12, wherein the M2M properties indicate an identity of each of said one or more M2M type networks or entities, together with local validity.

18. The method of claim 12, wherein the M2M properties indicate a type of each of said one or more M2M type networks or entities.

19. The method of claim 12, wherein the M2M properties indicate a location of each of said one or more M2M type networks or entities, relative to the location of the UE.

20. The method of claim 12, further comprising sending the message periodically irrespective of whether the M2M properties have been embedded within the message.

* * * * *